(12) United States Patent
Johnston et al.

(10) Patent No.: US 8,628,745 B2
(45) Date of Patent: Jan. 14, 2014

(54) INTEGRATED PROCESS FOR PRODUCING AMMONIUM NITRATE

(75) Inventors: Anthony Matthew Johnston, Double Bay (AU); Brian Scott Haynes, Frenchs Forest (AU)

(73) Assignees: The University of Sydney (AU); Orica International Pte Ltd., Singapore (SG)

( * ) Notice: Subject to any disclaimer, the term of this patent is extended or adjusted under 35 U.S.C. 154(b) by 0 days.

(21) Appl. No.: 13/699,766

(22) PCT Filed: Dec. 1, 2011

(86) PCT No.: PCT/AU2011/001557
§ 371 (c)(1),
(2), (4) Date: Feb. 1, 2013

(87) PCT Pub. No.: WO2012/155173
PCT Pub. Date: Nov. 22, 2012

(65) Prior Publication Data
US 2013/0149230 A1    Jun. 13, 2013

(30) Foreign Application Priority Data
May 16, 2011 (AU) ................................ 2011901871

(51) Int. Cl.
*C01C 1/18* (2006.01)
*C01B 21/40* (2006.01)

(52) U.S. Cl.
USPC ............................ 423/396; 423/392; 423/393

(58) Field of Classification Search
USPC ........... 423/395, 396, 493, 390.1–405; 71/50, 71/51, 58, 61
See application file for complete search history.

(56) References Cited

U.S. PATENT DOCUMENTS 3,560,147 A    2/1971  Janiczek et al.
4,699,773 A *  10/1987 Ulrichs et al. ................ 423/396

FOREIGN PATENT DOCUMENTS

DE    1 900 861    9/1970
GB    1 028 202    5/1966

OTHER PUBLICATIONS

International Search Report dated Feb. 15, 2012 issued in corresponding international patent application No. PCT/AU2011/001557.

* cited by examiner

*Primary Examiner* — Steven Bos
*Assistant Examiner* — Justin Bova
(74) *Attorney, Agent, or Firm* — Ostrolenk Faber LLP (57) ABSTRACT

A process for producing ammonium nitrate is disclosed and in which:
a) a gaseous oxidizer feed composed at least substantially of ammonia, steam and an oxidizing gas is exposed to conditions whereby the ammonia is oxidized to produce a reaction mixture including nitrogen monoxide and water vapor,
b) the reaction mixture is cooled in a heat exchanger whereby the nitrogen monoxide is oxidized, the water vapor is condensed and the products of the nitrogen monoxide oxidation react with and are absorbed by the condensed water to form a nitric acid stream, with substantially all of the nitrogen monoxide in the reaction mixture being converted to nitric acid, and
c) the nitric acid stream is reacted with a stream of ammonia in an ammonium nitrate producing stage to form the ammonium nitrate.
Substantially all of the steam within the oxidizer feed is derived from the ammonium nitrate producing stage, and at least 10% of the ammonia within the oxidizer feed is derived and carried by the steam from the ammonium nitrate producing stage.
Also disclosed is ammonium nitrate, in any of its various possible forms, when produced by the disclosed process.

20 Claims, 4 Drawing Sheets

Figure 4 ed at least substantially of ammonia, steam and an oxidising gas is exposed to conditions whereby the ammonia is oxidised to produce a reaction mixture including nitrogen monoxide and water vapour,

INTEGRATED PROCESS FOR PRODUCING AMMONIUM NITRATE

CROSS-REFERENCE TO RELATED APPLICATIONS

The present application is a 35 U.S.C. §371 National Phase conversion of PCT/AU2011/001557, filed Dec. 1, 2011, which claims benefit of Australian Application No. 2011901871, filed May 16, 2011, the disclosure of which is incorporated herein by reference. The PCT International Application was published in the English language.

TECHNICAL FIELD OF THE INVENTION

This invention relates to a process for producing ammonium nitrate and which integrates production of nitric acid with the production of ammonium nitrate.

BACKGROUND OF THE INVENTION

International patent Application No. PCT/AU2011/001556, dated 1 Dec. 2011, now International patent Publication No. WO 2012/071616 A1, published 7 Jun. 2012, based on Provisional Patent Application No. 2010905289, lodged in Australia in the names of Optint Pty Limited and University of Sydney on 1 Dec. 2010, discloses an integrated process for the production of ammonium nitrate in which:
a) a gaseous oxidiser feed composed at least substantially of ammonia, steam and an oxidising gas is exposed to conditions whereby the ammonia is oxidised to produce a reaction mixture including nitrogen monoxide and water vapour,
b) the reaction mixture is cooled in a heat exchanger whereby the nitrogen monoxide is oxidised, the water vapour is condensed and the products of the nitrogen monoxide oxidation react with and are absorbed by the condensed water to form a nitric acid stream, and
c) the nitric acid stream is reacted with a stream of ammonia to form the ammonium nitrate.

As disclosed in the referenced Patent Application, separate streams of the ammonia are fed to the nitric acid and ammonium nitrate producing stages. Also, in one embodiment of the disclosed process, steam that is generated in the course of concentrating an ammonium nitrate solution in the ammonium nitrate producing stage is transferred to the nitric acid producing stage to form at least a portion of the steam component of the oxidiser feed or to form a portion of a water or steam component of a starting feed from which the oxidiser feed is derived. As further disclosed in one embodiment, a small excess of ammonia may be supplied to the ammonium nitrate producing stage (for the purposes of minimising evaporator corrosion and suppression of the partial pressure of nitric acid in the vapour space of the evaporator) and, as a consequence, a small amount of ammonia (substantially less than 10% of the ammonia component of the oxidiser feed) might be fed to the nitric acid producing stage with the steam.

The present Inventors have now determined that, by feeding a substantial excess (i.e., at least 10%) of ammonia to the ammonium nitrate producing stage, the size of the ammonium nitrate reactor may be reduced, as may be the mixing precision requirement for complete reaction of the nitric acid. Also, it has been determined that the substantial excess of ammonia may usefully be fed from the ammonium nitrate producing stage to the nitric acid producing stage in a steam feed that comprises substantially the whole of that required by the nitric acid producing stage.

As also disclosed in the referenced Patent Application, the oxidising gas constituent of the oxidiser feed comprises a gas containing more than about 80% oxygen. However, the present Inventors have now determined that the oxidising gas may comprise air or another oxidising gas mixture that is less rich than 80% oxygen; accepting that the reaction-absorption volume will be substantially larger, but this being compensated by the potential for substantially reduced cost of employing a less oxygen-rich oxidising gas.

SUMMARY OF THE INVENTION

The present invention may be defined as providing a process for producing ammonium nitrate in which:
a) a gaseous oxidiser feed composed at least substantially of ammonia, steam and an oxidising gas is exposed to conditions whereby the ammonia is oxidised to produce a reaction mixture including nitrogen monoxide and water vapour,
b) the reaction mixture is cooled in a heat exchanger whereby the nitrogen monoxide is oxidised, the water vapour is condensed and the products of the nitrogen monoxide oxidation react with and are absorbed by the condensed water to form a nitric acid stream, with substantially all of the nitrogen monoxide in the reaction mixture being converted to nitric acid,
c) the nitric acid stream is reacted with a stream of ammonia in an ammonium nitrate producing stage to form the ammonium nitrate,
d) at least 80% of the steam within the oxidiser feed is derived from the ammonium nitrate producing stage, and
e) at least 10% of the ammonia within the oxidiser feed is derived and carried by the steam from the ammonium nitrate producing stage.

The present invention may also be defined as providing ammonium nitrate (in any of its various possible forms) when produced by the above process.

As employed in the above and following definitions of the invention the term "oxidising gas" is to be understood as including air or other oxidising gas mixture or, desirably, a gas containing more than about 80% and most desirably above 95% oxygen.

Also, by "substantially all" of the nitrogen monoxide in the above and following definitions of the invention is meant an amount of nitrogen monoxide greater than 90%, desirably greater than 95% and, most desirably, up to a level approaching as near as possible 100% of that present in the reaction mixture. When conversion within the heat exchanger occurs at a level lower than that which is most desired, the reaction-absorption process may be continued in a subsequent reactor-absorber vessel or pipe, with or without heat exchange. Thus, conversion approaching 100% in the heat exchanger is not essential because the reaction-absorption process may be continued, beyond that which occurs in the heat exchanger, in a subsequent adiabatic reactor-absorber, albeit to a limited extent. That is, it is known that higher temperatures are deleterious to nitrogen monoxide conversion and absorption and, to the extent that subsequent reaction-absorption is undertaken adiabatically, substantial temperature rises can occur in the reacting stream. For example, progressing from 99% to 100% nitrogen monoxide conversion adiabatically would entail a temperature rise of the order of 2.5° C., whereas progressing from 90% to 100% conversion would entail a temperature rise of 24° C.

Also, the term "concentration" as used within this specification is to be understood as meaning:
in the context of aqueous solutions—the percentage of pure solute (e.g., ammonium nitrate or nitric acid) in a solution on a w/w basis, and in the context of gaseous mixtures—the percentage of pure component (e.g., oxygen) in a mixture on a v/v basis.

The steam derived from the ammonium nitrate producing stage desirably comprises between 80% and 100% of the steam component of the gaseous oxidiser feed and most desirably comprises about 100% of the steam component of the gaseous oxidiser feed. When less than 100% of the steam is derived from the ammonium nitrate producing stage, the balance of the required steam will be derived from a separate source.

Whilst the ammonia derived from the ammonium nitrate producing stage may be as low as 10%, it desirably will be a substantially greater component and may comprise at least 80% of the ammonia component of the gaseous oxidiser feed, with the balance of the required ammonia feed being derived from an external source of ammonia. However, the ammonia derived from the ammonium nitrate producing stage desirably comprises between 80% and 100% of the ammonia component of the gaseous oxidiser feed and most desirably comprises about 100% of the ammonia component of the gaseous oxidiser feed. In this latter case and as described later in this specification, ammonia will be fed to the ammonium nitrate producing stage, from an external source, in an amount approximately equal to the total amount to be consumed in the ammonium nitrate producing stage and the nitric acid producing stage. This will be slightly more than double the amount to be consumed in the ammonium nitrate producing stage.

The nitric acid produced within the above defined process will inherently be dilute. The nitric acid will have, for example, a concentration of the order of 20% to 50%, depending upon the amount of water that is contained in the reaction mixture and on the composition of the oxidising gas. As a consequence, in this case, the ammonium nitrate produced by initial reaction of the dilute nitric acid and ammonia in the ammonium nitrate producing stage will also represent a relatively low weight fraction (e.g., of the order of 30% to 60%) of the reaction product stream (which may be two-phase), but the ammonium nitrate solution in the resultant liquid phase may be concentrated up (e.g., to a level of the order of 75% to 85%) by addition of heat, (which may be derived from the nitric acid producing stage as described below), to drive off excess water.

Heat for concentrating the ammonium nitrate solution in the abovementioned reaction product stream may be transferred to the ammonium nitrate producing stage by direct heat exchange between the reaction mixture (that is derived from ammonia oxidation within the nitric acid producing stage) and the two phase reaction product stream, or by indirect heat exchange between the two stages using an intermediate coupling loop of a heat transfer medium such as water or steam/water. Such heat may also be derived from the heat of reaction between the ammonia and the nitric acid and/or from an external source.

In one embodiment of the present invention, the steam and ammonia for the oxidiser feed are derived from a phase separator device associated with an ammonium nitrate solution evaporator within the ammonium nitrate producing stage. Liquid-vapour phase separation may be assisted within the separator device in any one of various possible ways, including by electrostatic precipitation or by the employment of a demister device for assisting the disengagement of liquid droplets containing ammonium nitrate. In the latter case the demister device may (but need not necessarily) be sprayed with water or other liquid to avoid a build-up of ammonium nitrate solids. If water or other liquid is employed, it may be derived either from an external source or from within the ammonium nitrate producing stage itself.

In a further embodiment of the invention at least two ammonium nitrate solution evaporators and, respective, associated separator devices may be incorporated in the ammonium nitrate producing stage, whereby the steam and ammonia for the oxidiser feed may be derived from a first of the separators and at least a portion of (further) steam from the second of the separators may be condensed to form a liquid stream to be employed as wash water for demister device(s) in one or the other or both of the phase separator devices.

In an alternative embodiment in which wash water may be required, a single ammonium nitrate solution evaporator might be employed and the vapour phase from an associated (single) separator be divided into two streams, one to comprise the oxidiser feed and the other to be condensed for employment as a wash water feed, the latter of which may contain a significant concentration of dissolved ammonia.

With integration of various possible (optional) embodiments of the present invention, an integrated process may be achieved in which, at steady state:
a) The only two material feeds to the process are ammonia and an oxidising gas, desirably a gas containing at least 80% oxygen but, as an alternative, air. The ballast steam and the wash water (if employed) used in the process are generated by chemical reactions within the process itself and exit as (part of) the end product.
b) There is, as a consequence of (a), no need for a water feed, and no contaminated water or effluent stream need be produced; although start-up could require some temporary feeds and effluent.
c) The integrated process is self-sufficient in heat.
d) When the oxidising gas comprises oxygen, there will be no substantial effluent stream, other than the product stream and a tail gas stream which is composed principally of constituents other than oxygen initially present in the oxidising gas stream and excess oxygen; although, when the oxidising gas comprises air there will be a substantial tail gas effluent stream containing the nitrogen originally present in the air.
e) If two evaporators and wash water feeds are employed, the flow of steam ballast directed to the oxidiser may be adjusted by changing the heat load balance between the two evaporators, with, for example, an increase in steam ballast flow being accompanied by a corresponding decrease in wash water flow.

The steam in the oxidiser feed contributes to maintaining the ammonia-oxygen mixture below the explosive limit and to moderate the temperature rise during ammonia oxidation, as well as to function, when condensed, to absorb the products of the nitrogen monoxide oxidation.

The heat exchanger that is employed in the absorption process in the nitric acid producing stage may comprise any type of heat exchanger that provides for heat transfer from a process fluid (in the present invention the reaction mixture) to a coolant fluid; for example a shell-and-tube type heat exchanger, a printed-circuit type heat exchanger, a plate type heat exchanger or a fin-fan type heat exchanger. Fluid flow passages within the heat exchanger desirably have a small cross-sectional dimension (e.g., less than about 3 mm and desirably less than 2 mm equivalent diameter) in order to assist heat an mass transfer and to facilitate heat exchanger compactness. Also, depending upon processing demands, a single heat exchanger may be employed or two or more heat exchangers may be connected in parallel or in series, and the expressions "a heat exchanger" and "the heat exchanger" as employed in this specification are to be understood in this context. The coolant fluid may comprise a gas, for example fan forced air, or a liquid such as water.

The novel employment of the heat exchanger to complete the absorption in the absorption stage (as distinct from the employment in the prior art processes of a counter-current absorption tower) results in the production of relatively dilute nitric acid. Such acid has low equilibrium vapour pressures of nitric acid and nitrous gases, this obviating the need for counter-current contacting to achieve complete absorption of these components. Nevertheless, the rate at which the conversion of nitrogen monoxide to acid occurs, as the process nears completion, is determined principally by the chemical rate of oxidation of nitrogen monoxide, which is strongly promoted by higher concentrations of nitrogen monoxide and oxygen. In the process of the present invention the steam that is employed to ballast the oxidation process substantially condenses during the course of the absorption process to form a part of the dilute nitric acid product, thereby increasing the concentration of the residual gaseous reactants and facilitating their relatively rapid reaction and absorption. The effect is to intensify the reaction/absorption process, which effect is greatest when, as in accordance with one embodiment of the invention, the oxidising gas composition is close to 100% oxygen. In an alternative embodiment of the invention, when the oxidising gas comprises air or another gas mixture containing substantially less than 100% oxygen, a non-condensable diluent gas (for example, a mixture of nitrogen and argon) attenuates the intensification achievable upon condensation of the steam, this requiring that the heat exchanger be larger than would be necessary with a more oxygen-rich oxidising gas. If the oxidising gas comprises air, the heat exchanger may need to be two orders of magnitude or more greater in volume than would be required for an oxidising gas comprising close to 100% oxygen, but, as previously stated, this may be compensated for by the potential for substantially reduced cost of employing a less oxygen-rich oxidising gas.

When air, for example, is employed in lieu of oxygen as the oxidising gas component of the oxidiser feed, just sufficient air desirably will be fed to the ammonia oxidation stage (hereinafter referred to as "the oxidiser") to complete the oxidation of ammonia. The remainder of air (as required for oxidation of the nitrogen monoxide) will then be fed into the reaction gas stream following the oxidiser and prior to the absorption stage heat exchanger. It is generally desirable to minimise air flow to the oxidiser in order to minimise any preheating requirement for the air and flow through the oxidiser. The need, if any, for preheating of the air will be determined by the steam-ammonia recycle flow to the oxidiser, and any preheating that may be required desirably is effected by heat exchange with the reaction gas stream in order to achieve the required oxidiser temperature.

When the oxidising gas comprises a gas containing more than about 80% oxygen (hereinafter referred to as "oxygen"), the oxygen in the oxidiser feed may be provided in an amount sufficient to oxidise substantially all of the ammonia and substantially all of the nitrogen monoxide. Alternatively, the oxygen in the feed may be provided in an amount sufficient to oxidise substantially all of the ammonia and additional oxygen be added to the reaction mixture before the water vapour condenses in order to oxidise substantially all of the nitrogen monoxide.

In the ammonia oxidation stage (where the steam-ballasted ammonia-oxidising gas feed is oxidised to form, predominantly, nitrogen monoxide within nitrous gas), the oxidiser feed may be heated to a temperature falling within the range 700° C. to 1000° C. (typically about 800° C.), at a pressure falling within the range 1 bar (abs.) to 15 bar (abs.) (typically about 2 bar (abs.)) in the presence of a catalyst. The catalyst may be embodied in any known type of catalytic system, including a cobalt oxide bed or a platinum-rhodium catalyst in the form of woven or knitted gauze layers. The heating of the oxidiser feed in the oxidiser may be brought about by the adiabatic heat release of the reaction, or by heat exchange with an external fluid, or by a combination of both. When heat exchange is effected for heating or for cooling, the oxidiser may comprise a heat-exchanger reactor.

The reaction mixture from the ammonia oxidation process may be cooled to a first temperature above the dew point of the reaction mixture (e.g., to a temperature of about 140° C.) by heat exchange with a heat transfer fluid. That heat transfer fluid may be employed to transfer heat for concentrating (by evaporation) the ammonium nitrate solution in the ammonium nitrate producing stage. Thus, in the case of the embodiment of the invention as above described, the heat transfer fluid may be directed to a heat exchanger that constitutes the or, if more than one, each evaporator.

The oxidation of the nitrogen monoxide and concurrent reactions leading to the formation of the nitric acid are governed by the operating pressures and temperatures appropriate to system design and, at least in the final absorption phase, by the temperature of available coolant. Oxidation occurs only to a limited extent until post-oxidation cooling is initiated, that is (from the previously exemplified figures) at temperatures as high as 800° C. When the reaction mixture is cooled, the first liquid will form at the dew point at the operating pressure and the formation of acid will continue as the mixture is further cooled. At an operating pressure of about 15 bar (abs.) condensate will form and, thus, formation of nitric acid will commence, at the corresponding saturation temperature of about 200° C., and the acid formation will continue down to a temperature of about 50° C., assuming the latter temperature to be limited by the available coolant fluid temperature. For operation at 2 bar (abs.), the formation of acid will commence at about 110° C.

The composition of the gaseous impurities not condensed or absorbed in the absorbing phase in the nitric acid producing stage will depend upon the composition (e.g., air or oxygen) of the oxidising gas and, in the case of an oxidising gas composed of 80%+oxygen, may include excess unreacted oxygen, argon and other impurities introduced with the oxidising gas feed to the process, and nitrogen and nitrous oxide formed as by-products in the oxidiser. These gaseous impurities may be separated from the nitric acid by way of at least one separation vessel before the nitric acid and ammonia are reacted in the ammonium nitrate producing stage.

Since the nitric acid absorber receives its feed from the oxidiser whilst the ammonium nitrate evaporator delivers feed to the oxidiser, if mechanical vapour compression is to be avoided the nitric acid absorber pressure will need be below the ammonium nitrate reactor pressure, and the nitric acid will need be pumped to the reactor pressure.

Reaction of the nitric acid and ammonia in the ammonium nitrate producing stage may be effected by any method known in the art, including, for example, by co-flowing the reactants adiabatically through a suitable length of pipe or duct. The reaction might alternatively be effected in a non-adiabatic (heat exchange) reactor, in which the (co-flowing) reactants will be heated or cooled by a heat transfer medium. As a further alternative, the reaction may be effected by mixing the ammonia and nitric acid in a vessel which may, as required, either be heated or cooled. The reactor may also function as an evaporator.

The nitric acid may be heated prior to mixing with and reacting with the ammonia. In this way, at least some of the heat released by the reaction may result in the generation of steam, rather than result simply in preheating of the ammonium nitrate stream to a temperature below the boiling point in a following evaporator. Such preheating of the nitric acid may be effected by heat transfer from hot streams within the nitric acid producing stage, for example from the reaction mixture stream from the oxidiser or from a liquid recycle stream. Alternatively, the preheating of the nitric acid may be effected by heat transfer from steam that is separated from the ammonium nitrate solution in the abovementioned second separator.

The ammonia may be fed to the ammonium nitrate producing stage in liquid or, desirably, in gaseous form. The feed pressure will need to be at least as high as that of the nitric acid feed stream at the point of mixing, and the ammonia may be at any convenient temperature, typically at about ambient temperature.

The first evaporator will be operated at a pressure slightly above the ammonia combustor pressure, and desirably above atmospheric pressure, in order to avoid the possibility of air infiltration into the evaporator(s) and oxidiser. The evaporator(s) may be operated at, for example, 1.5 bar (abs.) to 2.5 bar (abs.).

The temperature of the evaporation depends upon the evaporation pressure and ammonium nitrate solution concentration. For example, the bubble point of 39% ammonium nitrate solution at 1 bar is 107° C., whereas the bubble point of 80% ammonium nitrate solution at 3 bar is about 168° C. It is known that the heating of solid ammonium nitrate to a temperature of 170° C. or more carries with it the risk of rapid decomposition of the ammonium nitrate, and is to be avoided. Therefore, for a product strength of, for example, the order of 80% ammonium nitrate, the evaporator(s) will practically be limited to operation below 3 bar (abs.).

Heat may be transferred (as above mentioned) from the nitric acid reaction mixture to the ammonium nitrate solution within the evaporator(s) by direct heat exchange contact between the streams, or indirectly by means of a heat transfer medium in an intermediate coupling loop; which may, for example, comprise a boiling/condensing water circuit or a single-phase pressurised water circuit. An intermediate heat transfer coupling loop may be employed to avoid the risk of excessively high wall temperatures (>170° C.) occurring in a heat exchanger which directly couples the hot reaction mixture (at, for example, 800° C.) with the boiling ammonium nitrate stream.

If insufficient heat is available from the nitric acid reaction mixture and the ammonium nitrate reaction to concentrate the ammonium nitrate to the required strength, heat from an external source may be supplied to the process, for example, by heating the heat transfer medium in the intermediate coupling loop.

The evaporation of water from the dilute ammonium nitrate solution may be effected in a variety of equipment configurations. For example, the evaporation of the dilute ammonium nitrate solution may be effected in a single pass-through (a once-through) evaporator heat exchanger.

Alternatively, boiling ammonium nitrate solution may be recirculated through the heat exchanger under the influence of gravity-driven buoyancy effects (i.e., natural circulation) or by pumping. For example, the evaporating heat exchanger may be submerged under the liquid level of boiling ammonium nitrate solution within a vessel, or form part of a thermosyphon loop external to a separator vessel.

In a further alternative the ammonium nitrate solution may be concentrated in a falling film evaporator.

In embodiments of the invention employing a boiling/condensing water intermediate heat transfer coupling loop, the steam saturation temperature must be above the bubble point of the required ammonium nitrate solution—for example, for 80% solution, above 152° C. in a 2 bar (abs.) evaporator, or above 127° C. in a 1 bar (abs.) evaporator. The mean temperature difference between the heating and boiling fluids in a once-through evaporator is greater than that between the fluids in a recirculating evaporator and, hence, the once-through evaporator may be smaller.

In embodiments of the invention employing a single phase intermediate heat transfer coupling loop and a recirculating evaporator, the heat transfer medium must circulate at temperatures above the bubble point of the required ammonium nitrate solution.

In embodiments employing a single phase intermediate heat transfer coupling loop and a once-through evaporator, the maximum temperature reached by the heat transfer medium must exceed the bubble point of the required ammonium nitrate solution. However the minimum temperature of the heat transfer medium need only exceed the bubble point of the dilute ammonium nitrate solution from the ammonium nitrate reactor, for example, for 39% ammonium nitrate solution, above 129° C. in a 2 bar (abs.) evaporator, or above 107° C. in a 1 bar (abs.) evaporator. Thus, when a single-phase intermediate heat transfer loop is used with a once-through evaporator, heat may be extracted from the nitric acid reaction mixture at lower temperatures than with the boiling/condensing water intermediate heat transfer coupling loop, thereby increasing the amount of heat recovered from the reaction mixture.

A further advantage of a once-through evaporator over a recirculating evaporator may be that the forced through-flow of ammonium nitrate solution may render it less prone to crystalline solids fouling than the submerged heat exchanger, where the pressure drops developed by natural circulation will typically be much lower than those arising with once-through flow, and hence less likely to clear developing obstructions.

The separator or (if two) each of the separators in which the vapour and liquid phases from the evaporator(s) are separated may comprise a separator vessel of any type known in the art. As indicated previously in the context of one embodiment of the invention, in order to assist the separation of liquid droplets from the evaporator steam, a demister device of one form or another may be employed towards the upper end of the separator vessel, and, in order to avoid the deposition of solids on such a demister device, it may be sprayed with wash liquid. The wash liquid may comprise condensate water (as above described) or a solution of nitric acid, ammonia or ammonium nitrate.

In one embodiment of the invention, when two evaporators are employed the wash liquid may be collected in drip trays and be fed to a second of the two evaporators before the residual liquid is fed back to the ammonium nitrate solution stream, to eliminate or minimise dilution of the ammonium nitrate solution that would otherwise be caused by the wash liquid.

Gaseous impurities may, in operation of the system, enter into either the nitric acid producing stage or the ammonium nitrate producing stage with the ammonia feed, with the oxygen feed and/or, if water make-up is required, with the water feed. Also, oxygen, nitrogen, argon and other gaseous impurities, that are not vented from a separator following the absorber, may pass from the nitric acid producing stage to the ammonium nitrate producing stage. However, in general, hydrogen (which may enter with the ammonia), will circulate within the integrated process until it reacts to form water in the ammonia combustor; and excess oxygen and non-condensable, inert gaseous impurities, such as argon and nitrogen, will circulate until they reach a vent point, most probably at the acid separator following the nitric acid absorber.

Dissolved impurities may enter the process in make-up water (if any), and may be discharged with the ammonium nitrate product.

Under some circumstances it is possible that sufficient heat may not be available from the reaction mixture (produced in the nitric acid producing stage) to concentrate the ammonium nitrate solution to the required extent. Then, in the absence of another source of heat at sufficiently high temperature within the integrated process to drive the evaporation process, alternative measures, such as multiple-effect evaporation and/or the importation of heat from an external source may be adopted.

In an embodiment of the invention in which, for example, the ammonia feed from the ammonium nitrate producing stage to the nitric acid producing stage comprises approximately 100% of the ammonia component of the oxidiser feed, a start-up procedure will need to be employed to initiate production of the nitric acid and consequential production of a two phase ammonium nitrate-steam mixture, to provide for feed-back of a steam-ammonia mixture to the nitric acid producing stage. Such a start-up procedure is described in general terms later in this specification.

The invention will be more fully understood from the following description of four illustrative embodiments of integrated processes for producing ammonium nitrate. The descriptions are provided by way of example with reference to the schematic flow diagrams as shown in the accompanying drawings.

DETAILED DESCRIPTION OF THE ILLUSTRATIVE EMBODIMENTS

The integrated process of producing ammonium nitrate as illustrated in each of FIGS. 1 to 4 involves two interdependent processes, one performed in a nitric acid producing stage ("nitric acid stage") 10 which is shown to the left of the median line 11 in the diagram and the other performed in an ammonium nitrate producing stage ("AN stage") 12 as shown to the right of the median line 11.

In general terms, a dilute nitric acid stream 13 from the nitric acid stage 10 is reacted with a stream of ammonia 14 in the AN stage 12 to form a two phase ammonium nitrate stream having a vapour phase consisting predominantly of steam and ammonia, and an ammonium nitrate solution liquid phase. The liquid phase is then concentrated by evaporation to form an ammonium nitrate product stream 15 of a required concentration. The concentration may be effected by way of a single evaporator and an associated separator as shown in FIGS. 1 and 4 or, as illustrated in FIGS. 2 and 3, by employment of two series-connected evaporators and associated separators.

Figure 2:
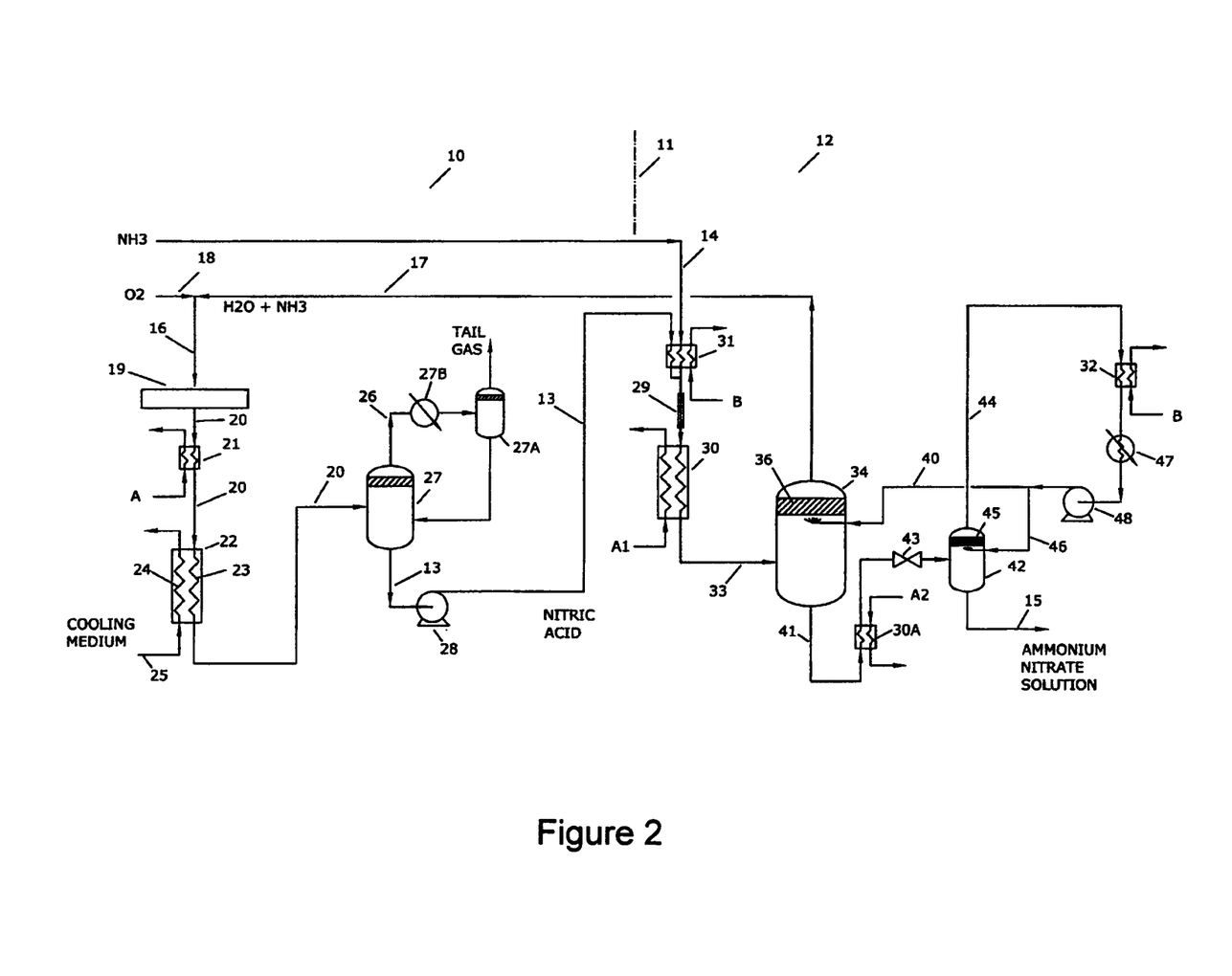
FIG. 2 shows a second embodiment of the integrated process, in which a steam stream is condensed and employed as wash water for a demister device within each of two steam-ammonium nitrate separators within the ammonium nitrate producing stage.
Figure 3:
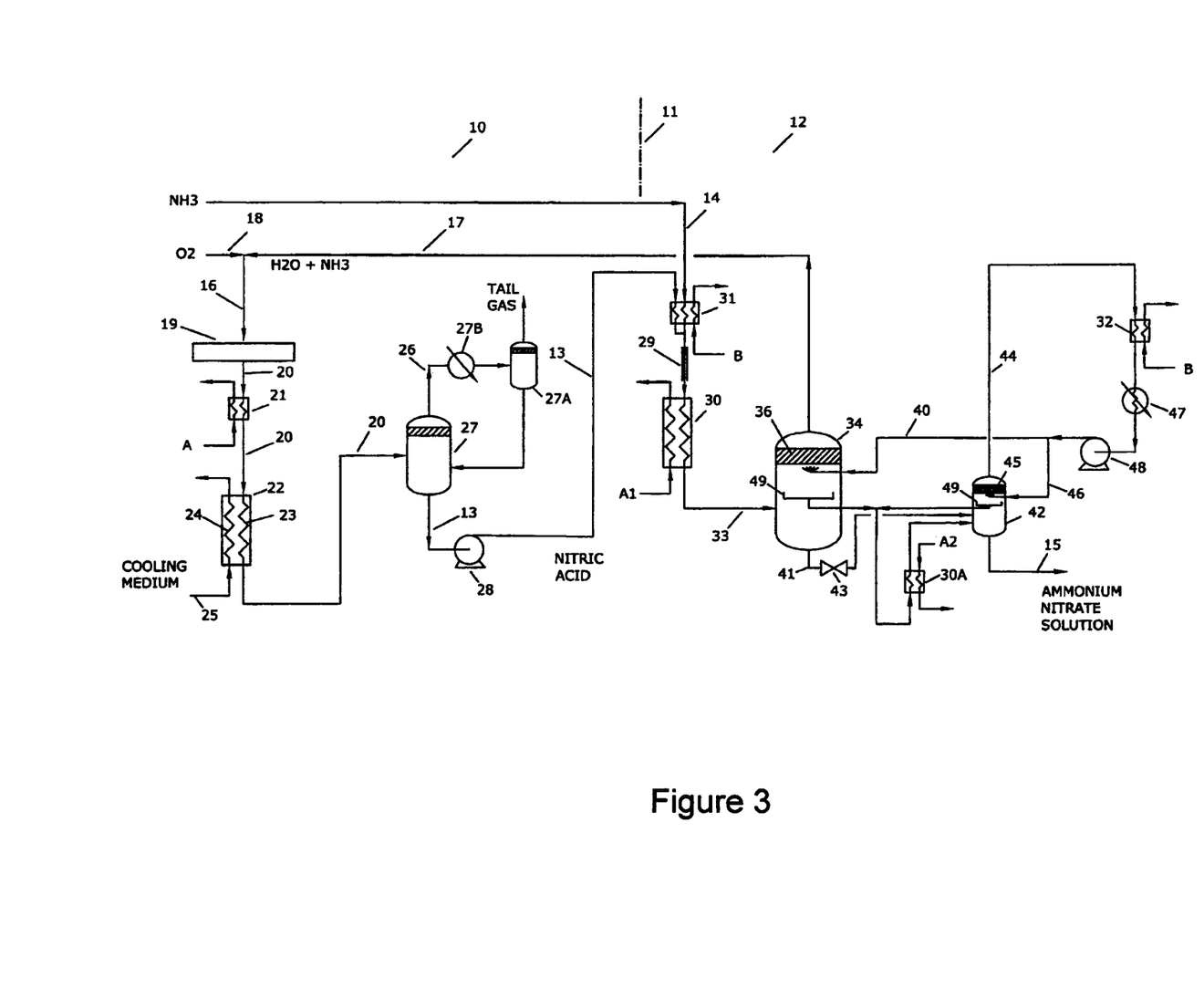
FIG. 3 shows a variation of the embodiment of FIG. 2, in which a wash water-ammonium nitrate mixture is retrieved from the separators within the ammonium nitrate producing stage.
Figure 4:
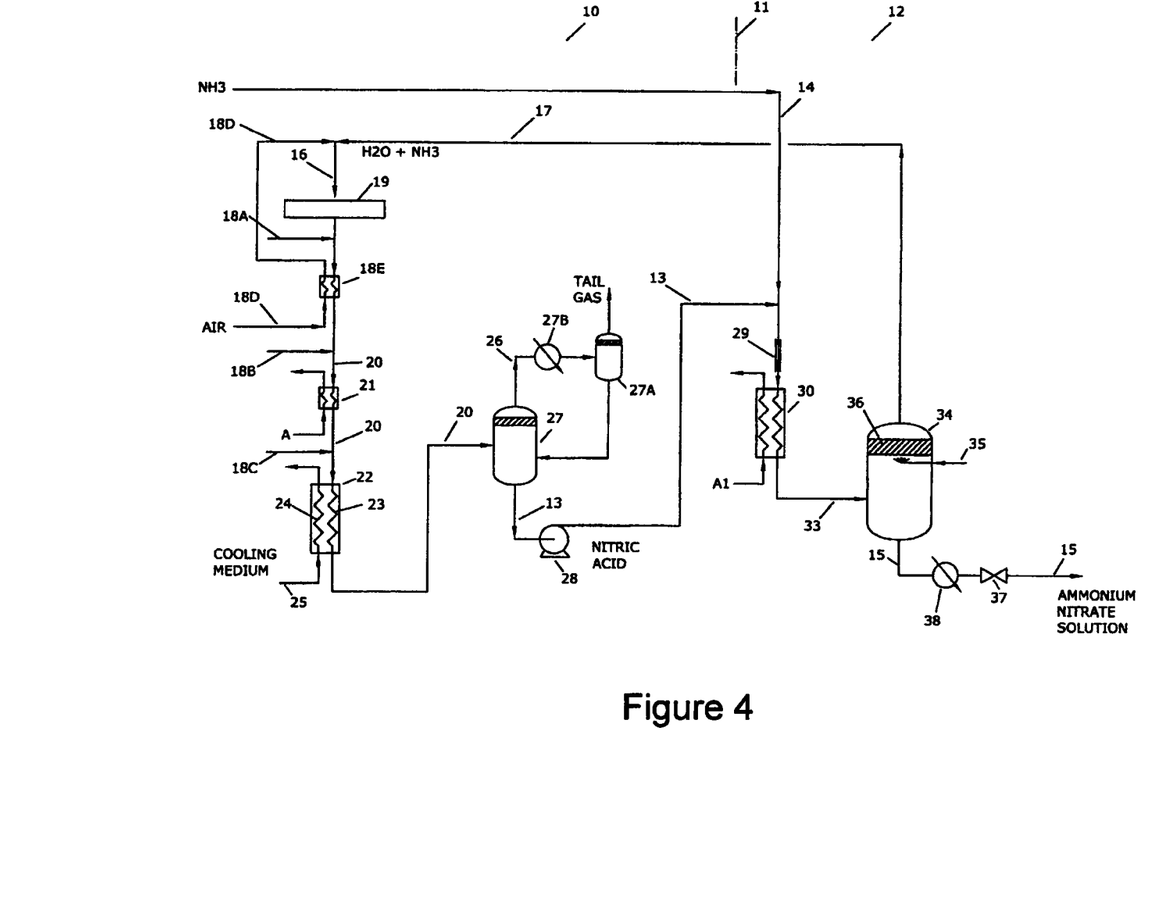
FIG. 4 shows a third embodiment of the integrated process, in which air, as an alternative to oxygen, is employed as an oxidising gas in the nitric acid producing stage

In the nitric acid stage 10 an oxidiser feed ("combustor feed") 16, composed of an ammonia-steam mixture feed component 17 and an oxidising gas feed component 18, as shown in FIG. 1 to 3, or 18D as shown in FIG. 4, is fed to an oxidiser ("combustor") 19. Both or, more accurately, all three (ammonia, steam and oxidising gas) components of the combustor feed are delivered under pressure slightly greater than the combustor pressure of about 2 bar (abs.) and at a temperature sufficient to preclude the formation of condensate in the feed. To this end the delivery line for the ammonia-steam mixture feed component 17 may be heated along at least a portion of its length to preclude any temperature drop along the line.

Figure 1:
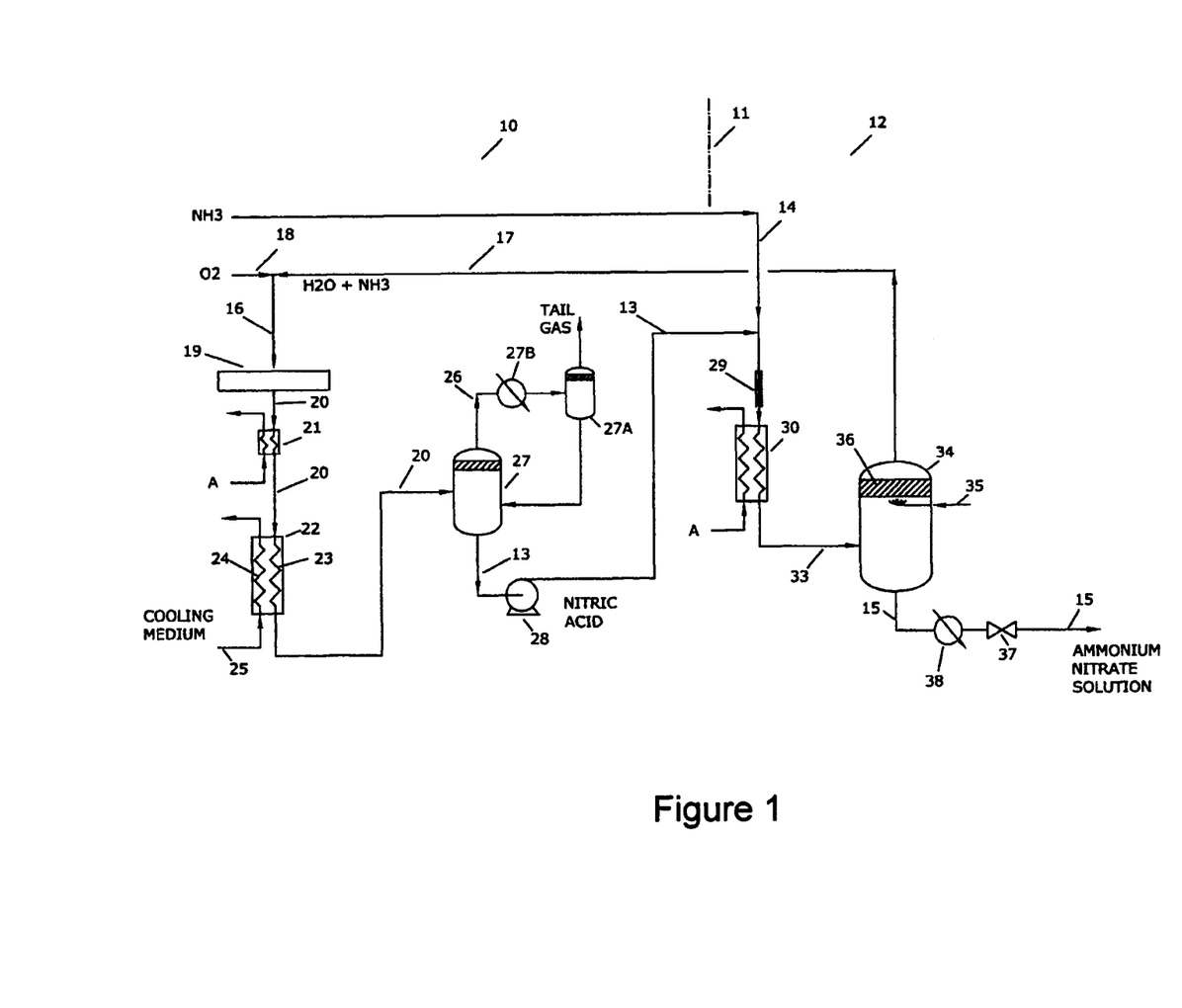
FIG. 1 shows a first embodiment of the integrated process, in which all of the steam and ammonia within an oxidiser feed to a nitric acid producing stage is derived from an ammonium nitrate producing stage.

In the embodiments of FIGS. 1 to 3 the oxidising gas feed 18 comprises oxygen, whereas in the embodiment of FIG. 4 the oxidising gas feed 18D comprises air. Aspects of the invention that are illustrated in FIG. 4, particularly in relation to the supply of air as the oxidising gas, are described in more detail later in this specification As illustrated in each of FIGS. 1 to 3, 100% of the steam component of the oxidiser feed 16 is derived from the AN stage 12. However, it will be appreciated that, within the context of the invention substantially all (e.g., 80% or more) of the steam may be derived from the AN stage, with a small make-up feed being derived from an alternative source (not shown). Similarly, whilst, as illustrated, 100% of the ammonia component of the oxidiser feed is derived from, and carried in the steam from, the AN stage 12, a portion (usually small but possibly up to a maximum of 90%) of the ammonia component may be derived from an alternative source (not shown).

The combustor 19 may comprise any type of ammonia oxidiser known in the art for use in high temperature catalytic conversion of an ammonia-oxygen mixture and may employ any known type of catalytic system, including a cobalt oxide bed. In one suitable form it may incorporate a platinum-rhodium catalyst in the form of woven or knitted gauze layers. In another form the combustor may be configured as a heat exchanger-reactor in which heat released during the reaction is transferred simultaneously to a coolant.

The steam-ballasted ammonia-oxidising gas feed 16 to the combustor 19 is heated by a combination of conduction, convection and radiation to the reaction temperature by the catalyst layers and reacts on the catalyst layers to form a reaction mixture that includes a nitrous gas stream. Except when oxidation is effected in a heat exchanger-reactor, the overall process is essentially (i.e., nearly) adiabatic and the temperature reached (assuming complete, highly-selective conversion of ammonia to nitrogen monoxide) is primarily a function of the concentration of ammonia present, the quantity of steam ballast present and the level of feed preheating. The temperature will typically be about 800° C. when the molar ratio of water to ammonia in the starting feed is about 5.6 and the mole fraction of ammonia in the combustor feed is about 11.4%. Such a combustor feed composition lies outside the expected ammonia explosion limits and gives rise to nitric acid product of about 20% to about 37% depending upon the amount of water that is contained in the reaction mixture The resultant reaction mixture, including nitrogen monoxide and water vapour, indicated as stream 20, is fed to a following heat exchanger 21 where the reaction mixture is cooled to a temperature above the level of dew point (e.g., to a temperature of the order of 140° C.) by heat exchange with a heat transfer fluid such as boiling water, pressurised single-phase water or oil.

On exiting from the heat exchanger 21 the cooled reaction mixture 20, in which nitrogen monoxide will have started to oxidise, is fed to an absorber in the form of a heat exchanger 22. Water vapour condensation and continuing oxidation of the nitrogen monoxide and concurrent reactions lead to the formation of nitric acid, in the heat exchanger 22, are governed by the operating pressures and temperatures employed in the system. Heat is exchanged between the cooled reaction mixture 20 (as it proceeds through channels 23 of the heat exchanger 22) and a heat exchange fluid 25, typically water, that is directed counter-current though channels 24 of the heat exchanger 22.

The heat exchanger 22 may comprise any type of heat exchanger that is known in the art to be suitable for use in condensing/oxidising the reaction mixture feed 20 down to dilute nitric acid, including a shell-and-tube type heat exchanger, a fin-fan type heat exchanger, a plate type heat exchanger or a printed circuit type heat exchanger. Fluid flow passages within the heat exchanger desirably have a small cross-sectional dimension (e.g., less than about 3 mm and desirably less than 2 mm equivalent diameter) in order to assist heat and mass transfer and to facilitate heat exchanger compactness. Also, although a single heat exchanger is shown for illustrative purposes in the respective Figures, the heat exchanger may comprise a single heat exchanger or it may be constituted by a plurality of heat exchangers connected in parallel or series, depending upon processing demands. The heat exchange fluid 25 may comprise any fluid (i.e., liquid or gas) appropriate to the type of heat exchanger that is employed.

Gases that are not condensed or absorbed in the heat exchanger are separated from the nitric acid, to form a tail gas 26, by a separator 27, leaving the gas-free nitric acid stream 13. The principal components of the tail gas 26 will be excess unreacted oxygen, argon and other impurities introduced with the oxygen feed to the process, nitrogen and nitrous oxide formed as by-products in the combustor, and water vapour.

The tail gas exiting the separator 27 will also contain very low concentrations of nitrous gases. However, as illustrated, the tail gas may be fed from the separator 27 to a further separator 27A by way of a chiller-condenser 27B, these vessels acting effectively to provide reaction-absorption subsequent to that provided in the heat exchanger 22. Nitrous gases and nitric acid vapour absorbed in the chiller-condenser create a very weak acid stream (typically <2%) that is fed back into the separator 27, thereby effectively eliminating the emission of nitric acid vapour and substantially reducing the NOx emissions from the process whilst also slightly enhancing product yield.

Supplementary oxygen, if required, may be injected into the reaction mixture 20 stream in order to provide for a small excess supply of oxygen to facilitate complete oxidation of nitrogen monoxide in the reaction mixture.

Similarly, if required, supplementary steam or water may be injected into the reaction mixture 20 stream in order to provide for sufficient condensate to facilitate complete oxidation and absorption of the nitrogen dioxide.

The dilute nitric acid stream 13 from the phase separator 27, at about the absorber pressure, is pumped by a pump 28 to a pressure slightly above that in a following ammonium nitrate reactor 29 and an evaporator 30 to allow for pressure drops through the intervening equipment.

The ammonium nitrate reactor 29, as illustrated, simply comprises a length of adiabatic pipe or duct in which the liquid phase of the two-phase stream, resulting from the reaction, will be only partially concentrated.

The hot, pressurised nitric acid stream 13 is mixed with the gaseous ammonia feed 14, at a similar pressure, and fed to the reactor 29, giving rise to the reaction stream 33, which comprises a two-phase stream consisting of ammonium nitrate solution in the liquid phase and a steam/ammonia mixture in the vapour phase. Overall about 39% of this two-phase stream will be ammonium nitrate. The release of reaction heat gives rise to vaporisation of water into the vapour phase and, consequently, partial concentration of the ammonium nitrate within the liquid phase. Sufficient excess of ammonia 14 is fed to the AN stage 12 to meet the entire ammonia component requirement of the oxidiser feed 16 for the nitric acid stage 10.

After passing through the heat exchanger-evaporator 30, the stream 33 is fed to a gravity separator 34, from which emerges the ammonium nitrate solution 15 (at about 80% concentration) and the vapour stream 17, the latter of which is predominantly a mixture of steam and ammonia, that is returned to the nitric acid stage 10. The concentration of the ammonium nitrate solution may drop to a 67% concentration level from about 80% concentration if it is diluted by water (as referred to below in relation to FIG. 2) from a demister device 36, and it is noted at this point that, in the event that such dilution would be caused to occur, it might be obviated in the process (to be described below) as illustrated in FIG. 3.

Because the pressure in the separator 34 will be slightly higher than the pressure in the combustor 19, the steam/ammonia mixture may flow from the separator to the combustor 19 without assistance from mechanical compression.

The demister device 36 is located within the separator 34 and is employed to assist the disengagement of liquid droplets containing ammonium nitrate from the steam. In the embodiment of the invention illustrated in FIG. 1, an external source 35 of wash-water is provided for spraying the demister device as and when required, for example during start-up or shut-down of the process.

The demister device 36 may comprise multiple demister pads, for example a lower one of chevron vanes and an upper one of knitted mesh.

To ensure that cooling of the feed stream 17 does not occur and, thus, to ensure that the combustor feed mixture 16 is superheated and does not contain water droplets which might impinge on the combustor catalyst, the steam stream 17 may if necessary be heated in its passage to the combustor 19 and/or the oxidising gas feed 18 to the combustor may be heated by heat exchange with heat transferred from the reaction mixture 20. In some instances the oxidising gas feed 18 may be sufficiently hot (for example 100° C. to 180° C.), due to compression in a compressor, for no further preheating of either feed to be required.

The ammonium nitrate solution 15 from the separator 34 is passed though a pressure let-down valve 37 by way of a cooler 38 to avoid flashing of the solution in the valve.

In the embodiments of the invention as illustrated in FIGS. 2 and 3, the dilute nitric acid stream 13 from the phase separator 27 and the ammonia stream 14 are preheated in a heat exchanger 31 by heat transferred (via a fluid loop B) from a wash water condenser 32.

Heat is added to the nitric acid stream 13 and the ammonia stream 14 in the heat exchanger 31 so as to ensure that part of the reaction heat released by the ammonium nitrate reaction generates steam. For example, in preheating the reactants to 95° C. sufficient heat will be released to concentrate the ammonium nitrate solution in the liquid phase of the stream 33 to 46% within the reactor, with the remainder of the evaporation heat to the first evaporator 30 and to a second evaporator 30A being provided by heat transfer (via fluid loop A) from the heat exchanger 21.

After passing through the first heat exchanger-evaporator 30, the stream 33 is fed to a first gravity separator 34, from which emerges ammonium nitrate solution 35 and the vapour stream 17, the latter of which is predominantly a mixture of steam and ammonia that, as above described in the context of FIG. 1, is returned to the nitric acid stage 10.

The demister device 36 is located within the separator 34 and is employed to assist the disengagement of liquid droplets containing ammonium nitrate from the steam. To avoid the build-up of ammonium nitrate solids on the device, the lower face of the or, if more than one, each component of the device 36 is sprayed with water from a stream 40.

Substantial quantities of ammonium nitrate in the oxidiser feed should be avoided because any deposited ammonium nitrate solution in the feed pipe might be dried-out under some conditions (e.g., start up or shut down) and present an explosion hazard. Spraying the demister device 36 may in some circumstances be necessary for achievement of a high degree of liquid-vapour separation. Also, it is desirable that an ammonium nitrate concentration in the steam to the oxidiser be several orders of magnitude (e.g., 5) lower than that in the ammonium nitrate solution.

Due to the steam feed stream 17 contacting the liquid water stream 40 on the demister pad 36, cooling of the steam stream may occur. To ensure that the combustor feed mixture 16 is superheated and does not contain water droplets which might impinge on the combustor catalyst, the steam stream 17 may be heated in its passage to the combustor 19 and/or the oxygen feed component 18 to the combustor may be heated by heat exchange with heat transferred from the reaction mixture 20.

In the FIG. 2 embodiment, the ammonium nitrate solution 41 from the separator 34 is further concentrated (to about 83%) in the second heat exchanger-evaporator 30A, from which it passes to a second gravity separator 42 by way of a valve 43 in which further evaporation, by flashing, occurs. The resulting two-phase ammonium nitrate-steam mixture (with little ammonia in the vapour phase) is further separated as a steam stream 44 and the ammonium nitrate solution product stream 15. The solution is diluted again by water dripping from a demister device 45.

The demister device 45 is located within the separator 42 and, as in the case of the demister device 36, is employed to assist the disengagement of liquid droplets containing ammonium nitrate from the steam. The device 45 is sprayed with water from a stream 46 to avoid the build-up of ammonium nitrate solids.

The steam stream 44 is passed through the partial condenser 32 and a following full condenser 47, and water condensate is delivered by a pump 48 to the two wash water streams 40 and 46.

The embodiment of the invention as illustrated in FIG. 3 is similar to that described above with reference to FIG. 2 and, as in the case of the embodiments of FIGS. 1 and 2, like reference numerals are used to identify like components.

However, in the FIG. 3 embodiment the wash water containing ammonium nitrate which has been entrained as solution droplets in the vapour phase of the separator, is retrieved in drip trays 49 in each of the separators 34 and 42 and is passed through the second evaporator 30A before entering the second separator 42. With this arrangement, dilution which would otherwise arise from mixing of wash water draining from the demister devices with concentrated ammonium nitrate solution from the evaporators is eliminated or, at least, minimised.

The first evaporator 30 functions, in effect, as a single ammonium nitrate solution evaporator producing concentrated ammonium nitrate solution, with the second evaporator 30A receiving a very dilute ammonium nitrate solution from which the wash water is recovered by evaporation of most of the water. The very dilute ammonium nitrate solution draining from the demister devices 36 and 45 is retrieved in the separators before being evaporated in the second evaporator 30A, and the liquid residue mixes with the concentrated ammonium nitrate solution.

In the embodiments of both FIG. 2 and FIG. 3, the second separator 42 desirably is operated at a lower pressure than the first separator 34, so that additional evaporation of the ammonium nitrate solution will occur as it flashes through the valve 43 from the higher pressure to the lower.

In start-up of the above described processes, as for example that illustrated by FIG. 1, an external heat source may be employed to heat fluid loop A to a suitable temperatures approximating that employed in steady-state operation of the process. Water may then be introduced into the nitric acid separator 27 or a separate start-up tank may be installed in parallel with separator 27, for example, allowing generation of steam in the evaporator(s) and, consequently, providing for circulation of ballast steam through the oxidiser. Under some circumstances it may be preferred to mix the water with ammonium nitrate drawn from the separator 34 prior to the evaporator. Once the circulation of ballast steam is established, ammonia and oxygen may safely be introduced to the ballast steam and the oxidiser be ignited by an established method, thereby initiating the production of nitric acid and, consequently, ammonium nitrate.

Reference is now made to the illustrative embodiment shown in FIG. 4. This in some respects is similar to that described above with reference to FIG. 1 and, again, like reference numerals are used to identify like components.

In the nitric acid stage 10 an oxidiser feed 16, composed of an ammonia-steam mixture feed component 17 and an oxidising gas feed component 18D is fed to the oxidiser 19.

As indicated in FIG. 4, the oxidising gas comprises air (as distinct from oxygen as identified as the oxidising gas in the processes described with reference to FIGS. 1 to 3) and, although not essential to the process, as illustrated the air feed 18D is passed through a heat exchanger 18E where it is preheated by heat exchange with the reaction gas stream 20. When sufficient steam ballast is provided to produce nitric acid at about 33.5% acid, the air will need to be preheated to about 600° C. in order for the required oxidiser temperature to be achieved. However, when a lower quantity of steam ballast is recycled, for example producing nitric acid strength of about 47%, the air may be sufficiently heated by compression for no additional preheating to be required.

The air feed 18D is selected such that just sufficient air is fed to the oxidiser 19 to provide for complete oxidation of the ammonia feed to the oxidiser. Further air, as required to enable oxidation of the reaction gases to the point of nitric acid production, is fed to the reaction gas stream 20 at any one or more of the feed points 18A to 18C preceding the heat exchanger/absorber 22.

Other aspects of the process illustrated by FIG. 4 are substantially the same as those that have been described previously with reference to FIG. 1, although the extent to which steam is recycled in the process will give rise to different compositions at different points in the process.

The temperature of the reaction mixture will typically be about 800° C. and the nitric acid end product will have a concentration of about 20% to about 50%. For example, when the nitric acid has a concentration of about 47% and the oxidiser feed has a composition of about 10% ammonia, 13% oxygen and 28% steam, with the balance predominantly nitrogen and argon from the air, the resultant ammonium nitrate solution (i.e., the liquid phase emerging from the ammonium nitrate reactor 29, prior to the evaporator 30, will have a concentration of about 68%.

The heat exchanger 22 may, as previously described, comprise any type of heat exchanger, including a plurality of series or parallel connected heat exchangers. As previously stated, when, as in the case of the FIG. 4 embodiment, the oxidising gas comprises air, the heat exchanger will need to be larger (typically by two orders of magnitude) than one that would be employed when the oxidising gas comprises a more oxygen-rich gas.

Gases that are not condensed or absorbed in the heat exchanger 22 are separated from the nitric acid, to form the tail gas 26, by the separator 27, leaving the gas-free nitric acid stream 13. As distinct from the embodiments of FIGS. 1 to 3, the major component of the tail gas will be the nitrogen contained within the oxidising gas (i.e., air).

Variations and modification may be made in respect of the above described embodiments of the invention without departing from the scope of the invention as defined above and in the following claims.

What is claimed is:

1. A process for producing ammonium nitrate in which:
   a) a gaseous oxidiser feed comprising ammonia, steam and an oxidising gas is exposed to conditions whereby the ammonia is oxidised to produce a reaction mixture including nitrogen monoxide and water vapour,
   b) the reaction mixture is cooled in a heat exchanger whereby the nitrogen monoxide is oxidised, the water vapour is condensed and the products of the nitrogen monoxide oxidation react with and are absorbed by the condensed water to form a nitric acid stream, with substantially all of the nitrogen monoxide in the reaction mixture being converted to nitric acid,
   c) the nitric acid stream is reacted with a stream of ammonia in an ammonium nitrate producing stage to form an ammonium nitrate solution,
   d) at least 80% of the steam within the oxidiser feed is derived from the ammonium nitrate producing stage, and
   e) at least 10% of the ammonia within the oxidiser feed is carried by the steam from the ammonium nitrate producing stage and is derived from ammonia that is excess to that stage.

2. A process as claimed in claim 1 wherein the steam derived from the ammonium nitrate producing stage comprises about 100% of the steam component of the gaseous oxidiser feed.

3. A process as claimed in claim h wherein the ammonia derived from the ammonium nitrate producing stage comprises at least 80% of the ammonia component of the gaseous oxidiser feed, with the balance of the required ammonia feed being derived from a different source.

4. A process as claimed in claim 1, wherein the ammonia derived from the ammonium nitrate producing stage comprises about 100% of the ammonia component of the gaseous oxidiser feed.

5. A process as claimed in claim 1, wherein the steam and ammonia derived from the ammonium nitrate producing stage comprise about 100% of the steam and ammonia components respectively of the gaseous oxidiser feed.

6. A process as claimed in claim 1, wherein an ammonia feed is fed to the ammonium nitrate producing stage in an amount approximately equal to the total amount to be consumed in the ammonium nitrate producing stage and the nitric acid producing stage.

7. A process as claimed in claim 1, wherein the oxidising gas comprises a gas containing at least 80% oxygen.

8. A process as claimed in claim 1, wherein the oxidising gas comprises a gas containing at least 90% oxygen.

9. A process as claimed in claim 1, wherein the oxidising gas comprises a gas containing at least 95% oxygen.

10. A process as claimed in claim 7, wherein the oxidising gas in the oxidiser feed is provided in an amount sufficient to oxidise the ammonia in the oxidiser feed and substantially all of the nitrogen monoxide in the reaction mixture.

11. A process as claimed in claim 7, wherein the oxidising gas in the oxidiser feed is provided in an amount sufficient to oxidise the ammonia in the oxidiser feed and some of the nitrogen monoxide in the reaction mixture and wherein additional oxidising gas is added to the reaction mixture to facilitate substantially complete oxidation of the nitrogen monoxide in the reaction mixture.

12. A process as claimed in claim 1, wherein the oxidising gas comprises air.

13. A process as claimed in claim 12 wherein the oxidising gas in the oxidiser feed is provided in an amount just sufficient to oxidise the ammonia in the oxidiser feed and wherein additional oxidising gas is added to the reaction mixture to facilitate substantially complete oxidation of the nitrogen monoxide in the reaction mixture, the additional oxidising gas being admitted to the reaction mixture following oxidising of the ammonia and prior to the heat exchanger.

14. A process as claimed in claim 12, wherein the oxidising gas is heated prior to mixing with the steam and ammonia components of the oxidiser feed.

15. A process as claimed in claim 14 wherein the oxidising gas is heated by heat exchange with the reaction mixture.

16. A process as claimed in claim 1, wherein the ammonium nitrate solution is concentrated in an evaporator within the ammonium nitrate producing stage.

17. A process as claimed in claim 16 wherein a phase separator is provided for receiving a two-phase (ammonium nitrate-steam) stream from the evaporator, and wherein steam is separated from the two-phase stream in the separator and is returned to the nitric acid producing stage, to form the steam component of the oxidiser feed, together with entrained ammonia that is supplied to the ammonium nitrate producing stage in excess of that consumed in reacting with the nitric acid.

18. A process as claimed in claim 1, wherein the ammonium nitrate solution is concentrated in two, first and second, series connected evaporators, wherein a first phase separator is provided for receiving a two-phase (ammonium nitrate-steam) stream from the first evaporator, and wherein steam is separated from the two-phase stream in the first separator and is returned to the nitric acid producing stage, to form the steam component of the oxidiser feed, together with entrained ammonia that is supplied to the ammonium nitrate producing stage in excess of that consumed in reacting with the nitric acid.

19. A process as claimed in claim 18 wherein a second phase separator is provided for receiving a two-phase stream from the second evaporator, and wherein steam is separated from the two-phase stream in the second phase separator and is employed in a condensed state as wash water a demister device that is located in either one or each of the first and second phase separators.

20. A process as claimed in claim 1, wherein the nitrogen monoxide in an amount approaching 100% of that in the reaction mixture is converted to nitric acid in the nitric acid producing stage.

* * * * *